(12) United States Patent
Kondou et al.

(10) Patent No.: US 8,779,086 B2
(45) Date of Patent: Jul. 15, 2014

(54) ELECTROCHROMIC MATERIAL AND A METHOD FOR PRODUCING THE SAME

(75) Inventors: Yoshirou Kondou, Tsukuba (JP); Tomiaki Otake, Tsukuba (JP)

(73) Assignee: Kuraray Co., Ltd., Okayama (JP)

( * ) Notice: Subject to any disclaimer, the term of this patent is extended or adjusted under 35 U.S.C. 154(b) by 168 days.

(21) Appl. No.: 13/583,106

(22) PCT Filed: Mar. 8, 2011

(86) PCT No.: PCT/JP2011/055314
§ 371 (c)(1),
(2), (4) Date: Sep. 6, 2012

(87) PCT Pub. No.: WO2011/111683
PCT Pub. Date: Sep. 15, 2011

(65) Prior Publication Data
US 2013/0005941 A1    Jan. 3, 2013

(30) Foreign Application Priority Data

Mar. 10, 2010  (JP) .................................. 2010-053542

(51) Int. Cl.
*C08G 63/44*    (2006.01)
(52) U.S. Cl.
USPC ............. 528/363; 528/377; 528/128; 528/10; 548/153
(58) Field of Classification Search
USPC ...................... 528/363, 377, 128, 10; 548/153
See application file for complete search history.

(56) References Cited

U.S. PATENT DOCUMENTS

| | | | |
|---|---|---|---|
| 5,496,816 A | 3/1996 | Blizzard et al. | |
| 2007/0278453 A1 | 12/2007 | Zahn et al. | |
| 2007/0282099 A1 | 12/2007 | Zahn et al. | |
| 2008/0200634 A1 | 8/2008 | Duffy et al. | |

FOREIGN PATENT DOCUMENTS

| | | |
|---|---|---|
| JP | A-10-508285 | 8/1998 |
| JP | A-2008-7771 | 1/2008 |
| JP | A-2008-31430 | 2/2008 |
| JP | A-2009-501240 | 1/2009 |
| JP | A-2011-32426 | 2/2011 |
| KR | 10-2010-0088764 A | 8/2010 |

OTHER PUBLICATIONS

Kim et al., "A New Low Bandgap Conducting Polymer," *Polymer Prepints*, 2003, vol. 44, No. 1, pp. 1163-1164.
International Search Report issued in International Patent Application No. PCT/JP2011/055314 dated Jun. 14, 2011.

*Primary Examiner* — Shane Fang
(74) *Attorney, Agent, or Firm* — Oliff PLC

(57) ABSTRACT

An electrochromic material containing a π-electron based conjugated polymer that changes from a desired color developed state to a decolored state, and a method for producing the electrochromic material, are provided. The electrochromic material contains a π-electron based conjugated polymer as shown in chemical formula (1). In formula (1),

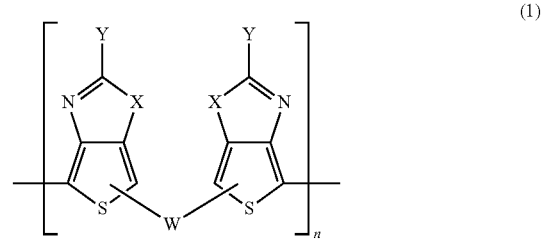

(1)

each X is any one selected from —S—, —O—, —Se— and —Te—; each Y is any one selected from a hydrogen atom and an organic group having 1 to 20 carbon atoms; W is an arylene group or divalent heteroaromatic ring group; and n is a number of 2 to 1,000. Repetition of this structure forms a structure of random copolymers, graft copolymers, block copolymers and/or dendrimers.

3 Claims, No Drawings

ELECTROCHROMIC MATERIAL AND A METHOD FOR PRODUCING THE SAME

TECHNICAL FIELD

The present invention relates to an electrochromic material useful for a display device capable of producing full-color display, and to a method for producing the electrochromic material.

BACKGROUND OF THE INVENTION

A traditional display system using a light emission type element as a light source or what is called an active display such as a cathode-ray tube (CRT), liquid crystal display (LCD), plasma display panel (PDP), electroluminescence display (ELD) etc. has characteristics of being bright and easy to see. However, these various displays have such problems as causing visual weariness when operating for a long time due to looking directly at the light emission type element or a light source. Further, mobile equipment such as mobile phones etc. are often used outdoors. They have also such a problem that visibility goes down under the sun light because light emission is offset. Demand for LCDs, which is a light emission type element, is expanding briskly and they are used for various large and small-sized displays. However, LCDs have such a problem of a narrow viewing angle, a problem to be improved in terms of viewability when compared with other light emission type elements.

Recently, demand for reflection type displays, which can display brightly in full color with excellent color purity and low power consumption, has been increasing.

In the meantime, with the popularization of computers, the amount of paper used for communication and storing of documents has been decreasing. However, there is still a strong tendency to print out digital information on paper and read it. Accordingly, the amount of paper scrapped after temporary use is increasing these days. In addition, the amount of paper that is daily consumed for printed books, magazines, newspapers, etc. is seen as a threat in terms of securing of resources and preservation of environment. As far as the medium is not changed, there is no prospect of decreasing the amount of paper scrapped. However, given the way of information recognition and the way of thinking by the human being, the superiority of "paper" over "display", such as a CRT or a transmission type liquid crystal display, cannot be ignored.

Therefore, development of an electronic paper or electronic medium, in which the merit of paper and the merit of displays are combined together, is expected. The electronic medium may be used as an alternative to paper. As desired characteristics for the electronic paper, being a reflection type display element, having high white reflectance and high contrast ratio, being capable of displaying with high definition, having memory effect in display, being capable of driving with a low voltage, being thin and light, being inexpensive, etc. can be exemplified.

As the display method of electronic paper, a reflection type liquid crystal method, an electrophoresis method, a two color ball method, an electrochromic (EC) method, etc. can be exemplified.

As the reflection type liquid crystal method, a G-H type liquid crystal method using dichromatic pigment, a cholesteric liquid crystal method, etc. can be exemplified. This reflection type liquid crystal method does not use a backlight so that it consumes small electric power when compared with the light emission type liquid crystal method. However this method has a view angle dependency and low light reflectivity, thereby has a problem that the screen inevitably becomes darker.

In the electrophoresis method which utilizes electrophoresis phenomenon, white pigment, black toner or the like is moved onto an electrode by the effect of an electric field. The two-color ball method comprises a spherical body painted with two colors such as white and black in a half-and-half manner. In this case, rotation by the effect of an electric field is utilized. Both methods have a merit that they consume low electric power and that they have no view angle dependency. However, in these methods, it is necessary to have enough gaps into which granular bodies can enter but closest packing is difficult to be achieved so that it is difficult to realize a high contrast display. In a case of full-color display, a juxtaposition mixture method using a color filter is applied, therefore there are problems such as a decrease in reflectivity and an inevitable decrease in brightness of the screen.

On the other hand, in the EC system, a color developing and reducing phenomenon is utilized, which appears together with a reversible oxidation-reduction reaction when an electric field is applied. The EC display element has been used widely in light control mirrors of automobiles, clocks, etc. The display having this EC display element, does not require polarization plate, etc., has no view angle dependency, is a light receiving type and accordingly has high visibility, has a simple structure and can be made large in size. Furthermore, this display can develop various color tones by selecting suitable material.

To display in full color using EC display element, it has been known that pigments capable of developing colors such as cyan (hereinafter, simply called C), magenta (hereinafter, simply called M), and Yellow (hereinafter, simply called Y), which are used in subtractive color mixture, are applied to stack the C, M, Y color-development layers to form a juxtaposition alignment or lamination alignment. Thereby, a display device capable of developing a full color is obtained. For example, black color can be displayed by mixing colors of C, M and Y, while white color can be displayed by bringing the pigments into colorless and transparent state, and also by making the background color white. As described above, the EC display elements are reflection type display elements in which color development/color reduction can be electrically repeated, they are superior to other display system in terms of burden to eyes and in terms of contrast.

As material for color development layer, a π-electron based conjugated polymer is publicly known. This π-electron based conjugated polymer is classified into various sort of polymers such as polypyrrole, polyaniline, polyparaphenyl vinylene, polythiophene, etc. and has great potential as material for polymer light emitting diodes, thin film displays, solid-state illumination, organic photocells, memory devices, organic field effect transistors, printed electronics, conductors, LASER, sensors, solid condensers, etc. Among this π-electron-based conjugated polymers, some that exhibit electrochromic characteristics have been known. To obtain an EC display element that can display in full color by development/reduction of the color of C, M and Y, it is necessary that the electrochromic characteristics of the π-electron-based conjugated polymers do a change from a color-developed state of C, M and Y to a colorless state respectively. However, the electrochromic characteristics of almost all of the general π-electron-based conjugated polymers do a color change between a color developed state to another color developed state, but material that exhibits color change from a color-developed state to colorless state is extremely rare.

As a typical material that exhibits a color change from a color developed state to a near colorless state, poly(ethylene-3,4-dioxythiophene) have been known so far. However, this material is a π-electron based conjugated polymer that does a color change from a color developed state having a dark blue color near to C color to a reduced state having a light blue color. No material has been known that does a color change from the color M or Y to a colorless state.

Japanese Patent Publication 2009-501240 and Jung Youl Lee et al., Polymer Preprints, 2003, vol. 44, No. 1 p. 1163 disclose a polymer having a structural unit of 2-alkylthieno [3,4-d][1,3]thiazole etc., a copolymer having a structural unit of thiophene, etc., and a method for producing a monomer compound of 2-nonylthieno[3,4-d][1,3]thiazole and its polymer. However, there were no disclosure about a monomer compound in which two molecules of such a compound as 2-alkylthieno[3,4-d][1,3]thiazole and 2-nonylthieno[3,4-d][1,3]thiazole etc. are joined together with an aryl compound, etc., and there were no description about a polymer obtained by polymerizing these monomers or the electrochromic characteristics of this polymer.

SUMMARY OF THE INVENTION

The present invention was made to solve the problems described above, and an object of the present invention is to provide an electrochromic material containing a π-electron based conjugated polymer whose color can be changed from a desired color-developed state to a colorless state.

An electrochromic material, which was made to achieve the aforementioned object comprises a π-electron based conjugated polymer represented by formula (1) shown below.

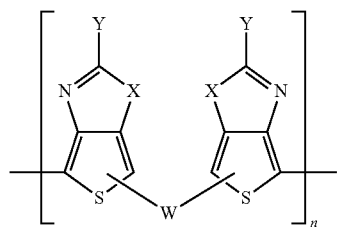
(1)

(in the formula: each X is respectively any one selected from —S—, —O—, —Se— and —Te—; each Y is respectively any one selected from a hydrogen atom and an organic group having 1 to 20 carbon atoms; W is an arylene group or divalent heteroaromatic ring group; n is a number of 2 to 1,000; and repetition of this structure forms a structure of a random copolymer, a graft copolymer, a block copolymer and/or a dendrimer)

A method for producing the electrochromic material comprises the steps of:
halogenating a compound represented by formula (2) shown below,

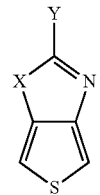
(2)

(in the formula: X is any one selected from —S—, —O—, —Se— and —Te—; and Y is any one selected from a hydrogen atom and an organic group having 1 to 20 carbon atoms) to obtain a compound represented by formula (3) shown below

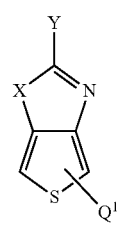
(3)

(in the formula, X and Y are the same as described above; and $Q^1$ is a halogen atom);

cross-coupling the compound represented by formula (3) with a compound represented by formula (4) shown below $$Q^2\text{-W-}Q^2 \qquad (4)$$

(in the formula: W is an arylene group or a divalent heteroaromatic ring group; $Q^2$ is one kind selected from —MgCl, —MgBr, —MgI, —ZnCl, —ZnBr, —ZnI, —Sn($R^1$)$_3$ (each $R^1$ is independently an alkyl group or alkoxy group having 1 to 20 carbon atoms), a boron acid group and a boronate ester group); or reacting the compound represented by formula (2) shown below,

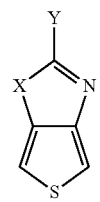
(2)

(in the formula: X and Y are the same as described above) in the presence of a base, with one kind selected from $MgCl_2$, $MgBr_2$, $MgI_2$, $ZnCl_2$, $ZnBr_2$, $ZnI_2$, $Sn(R^2)_3Cl$, $Sn(R^2)_3Br$, $Sn(R^2)_3I$ (each $R^2$ is independently an alkyl group or alkoxy group having 1 to 20 carbon atoms), a boron acid and a boronate ester to obtain a compound represented by formula (5) shown below

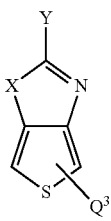
(5)

(in the formula: X and Y are the same as described above; $Q^3$ is one kind selected from —MgCl, —MgBr, —MgI, —ZnCl, —ZnBr, —ZnI, —Sn($R^1$)$_3$, (each $R^1$ is independently an alkyl group or alkoxy group having 1 to 20 carbon atoms), a boron acid group and a boronate ester group;
cross-coupling the compound represented by formula (5) with a compound represented by formula (6) shown below $$Q^4\text{-W-}Q^4 \quad (6)$$

(in the formula: W is the same as described above; each $Q^4$ is independently a halogen atom) to prepare a monomer ingredient represented by formula (7) shown below,

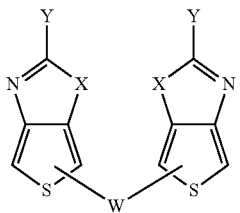
(7)

(in the formula: each X is respectively any one selected from —S—, —O—, —Se— and —Te—; each Y is respectively any one selected from a hydrogen atom and an organic group having 1 to 20 carbon atoms; W is an arylene group or a divalent hetero aromatic ring group), and
carrying out a polymerization of the monomer ingredient to produce a π-electron based conjugated polymer and the electrochromic material containing the polymer.

The method for producing the electrochromic material is a method wherein: the polymerization is carried out using a chemical polymerization of the monomer ingredient in the presence of or under a contact with a polyanion and an oxidant to produce the π-electron based conjugated polymer; or the polymerization is carried out using an electrolytic polymerization by supplying an electric current to a mixture containing the monomer ingredient and an electrolyte to produce the electron based conjugated polymer.

The present electrochromic material which contains a π-electron based conjugated polymer has characteristics in which when the material is de-doped it becomes a color developed state, and when the material is doped, it changes into a colorless state having no absorption maximum in the visible region. Therefore, it can be suitably used as an electrochromic material that changes in color from a desired color developed state to a colorless state.

According to the method for producing the present electrochromic material, the electrochromic material can be easily produced by using the composition comprising the π-electron based conjugated polymer and by selectively using a technique selected from coating, vapor depositing, molding, dipping, filling, etc.

According to the method for producing the present electrochromic material, a desired π-electron based conjugated polymer can be obtained when a suitable monomer ingredient is selected and accordingly a desired highly-pure electrochromic material can be obtained.

Hereinafter, preferred embodiments of the present invention will be precisely explained below, but the scope of the present invention should not be limited to the embodiments described here.

The present electrochromic material contains the π-electron based conjugated polymer represented by formula (1) shown below.

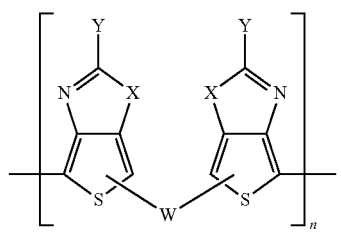
(1)

In the π-electron based conjugated polymer, as shown in formula (1), X in the formula is any one selected from —S—, —O—, —Se—, and —Te—. Y is any one selected from a hydrogen atom and an organic group having 1 to 20 carbon atoms which may have a substituent. W is an arylene group which may have a substituent or divalent heteroaromatic ring group which may have a substituent. Its number average molecular weight is in the range of 300 to 500,000.

Y is a hydrogen atom or an organic group having 1 to 20 carbon atoms which may have a substituent. In the organic group having 1 to 20 carbon atoms which may have a substituent, a bond other than the C—C bond such as ether bond, ester bond, amid bond, sulfonyl bond, urethane bond, thioether bond, etc. can be contained; further a double bond, a triple bond, an alicyclic hydrocarbon, a heterocyclic ring, an aromatic hydrocarbon, a heteroaromatic ring, etc. may be contained. As the organic group having 1 to 20 carbon atoms which may have a substituent, for example, an alkyl group which may have a substituent, an alkyenyl group which may have a substituent, an aryl group which may have a substituent, a cyclo alkyl group which may have a substituent, an alkoxy group which may have a substituent, an acylgroup which may have a substituent, an aralkyl group which may have a substituent group, an alkylsilyl group which may have a substituent, an alkoxy carbonyl group which may have a substituent, a heteroaromatic ring group which may have a substituent, etc. can be exemplified.

As the alkyl group, for example, methyl group, ethyl group, n-propyl group, isopropyl group, n-butyl group, isobutyl group, sec-butyl group, tert-butyl group, n-pentyl group, isopentyl group, neopentyl group, tert-pentyl group, n-hexyl group, isohexyl group, 2-ethylhexyl group, n-heptyl group, n-octyl group, n-nonyl group, n-decyl group, etc. can be exemplified.

As the alkeynyl group, for example, vinyl group, allyl group, methylvinyl group, propenyl group, butenyl group, pentenyl group, hexenyl group, cyclopropenyl group, cyclobutenyl group, cyclopentenyl group, cyclohexenyl group, etc. can be exemplified.

As the aryl group, for example, phenyl group, naphtyl group, anthryl group, phenanthryl group etc. can be exemplified.

As the cycloalkyl group, for example, cyclopropyl group, cyclobutyl group, cyclopentyl group, cyclohexyl group, cycloheptanyl group, cyclooctanyl group, cyclononanyl group, cyclodecanyl group, cycloundecanyl group, cyclododecanyl group, etc. can be exemplified.

As the alkoxy group, for example, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, n-hexyloxy group, isohexyloxy group, 2-ethylhexyloxy group, n-heptyloxy group, n-octyloxy group, n-nonyloxy group, n-decyloxy group, etc. can be exemplified.

As the acyl group, for example, acetyl group, propionyl group, butyryl group, isobutyryl group, benzoyl group, dodecanoyl group, pivaloyl group, etc. can be exemplified.

As the aralkyl group, for example, benzyl group, 4-methoxybenzyl group, phenetyl group, diphenylmethyl group, etc. can be exemplified.

As the alkylsilyl group, for example, trimethylsilyl group, triethylsilyl group, triisopropylsilyl group, tert-butyldimethylsilyl group, tert-butyldiphenylsilyl group, etc. can be exemplified.

As the alkoxy carbonyl group, for example, methoxy carbonyl group, ethoxy carbonyl group, 2,2,2-trichloroethoxycarbonyl group, n-propoxycarbonyl group, isopropoxycarbonyl group, allyloxycarbonyl group, n-butoxycarbonyl group, isobutoxycarbonyl group, sec-butoxycarbonyl group, tert-butoxycarbonyl group, pentyloxycarbonyl group, hexyloxycarbonyl group, heptyloxycarbonyl group, octyloxycarbonyl group, benzyloxycarbonyl group, etc. can be exemplified.

As the heteroaromatic ring, for example, thienyl group, furyl group, pyridyl group, imidazolyl group, pyrazinyl group, oxazolyl group, thiazolyl group, pyrazolyl group, benzothiazolyl group, benzimidazolyl group, etc. can be exemplified.

In addition, W is an arylene group which may have a substituent or a divalent hetero aromatic ring which may have a substituent.

As the arylene group, for example, phenylene group, 2,3-dialkyl phenylene group, 2,5-dialkylphenylene group, 2,3,5,6-tetraalkyl phenylene group, 2,3-alkoxyphenylene group, 2,5-alkoxyphenylene group, 2,3,5,6-tetraalkoxy phenylene group, 2-(N,N,-dialkylamino) phenylene group, 2,5-di(N,N,-dialkylamino) phenylene group, 2,3-di(N,N,-dialkylamino) phenylene group, p-phenylene oxide group, p-phenylene sulfide group, p-phenylene amino group, p-pheylene vinylene group, fluorenylene group, naphthylene group, anthrylene group, tetrasenylene group, pentasenylene group, hexasenylene group, heptasenylene group, naphthylene vinylene group, perinaphthylene group, aminopyrenylene group, phenanthrenylene group, etc. can be exemplified. One kind that is selected from these groups can be preferably used.

The divalent heteroaromatic ring is a group containing a divalent heteroaromatic ring derived from a heteroaromatic ring derivative. As the heteroaromatic derivative, for example, a carbazole derivative such as N-alkylcarbazole; a pyridine derivative such as pyrimidine, pyridazine, triazine, pyrazine, quinoline, purine etc.; a furan derivative such as 3-alkylfuran etc.; a pyrrol derivative such as N-alkylpyrrol, ethylene-3,4-dioxipyrrol, propylene-3,4-dioxypyrrol etc.; a thiophene derivative such as thiophene vinylene, alkyl thiophene, ethylene-3,4-dioxy thiophene, propylene-3,4-dioxy thiophene, thieno thiophene, thieno furan, thieno pyrazine, isothianaphthene etc.; a heterocyclic derivative such as oxadiazole, thiazyl, selenophene, tellurophene, imidazole, oxazole, thiazole, pyrazole, isoxazole, isothiazole, benzotriazole, pyran, benzothiadiazole, benzooxadiazole, etc. can be exemplified. One kind that is selected from these derivatives is preferably used.

As the substituent for these groups, for example, a halogen atom, hydroxyl group, amino group, cyano group, nitro group, alkyl and alkoxy group having 1 to 20 carbon atoms, etc. can be exemplified.

Such π-electron based conjugated polymer has a monomer ingredient represented by formula (7) shown below as a structural unit.

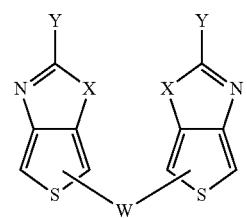

(7)

The structural binding sequence of the π-electron based conjugated polymer may be aligned regioregularly in a head-tail repeating structure, or may be a head-head repeating structure and/or tail-tail repeating structure.

The π-electron based conjugated polymer contained in the electrochromic material can be produced using a producing method described below.

The π-electron based conjugated polymer represented by formula (1) shown above can be obtained through electrochemical or chemical oxidative polymerization of the monomer ingredient represented by formula (7) shown above. The production method is specifically described below.

Firstly, a process to obtain the monomer ingredient is shown by reaction equation (1) shown below.

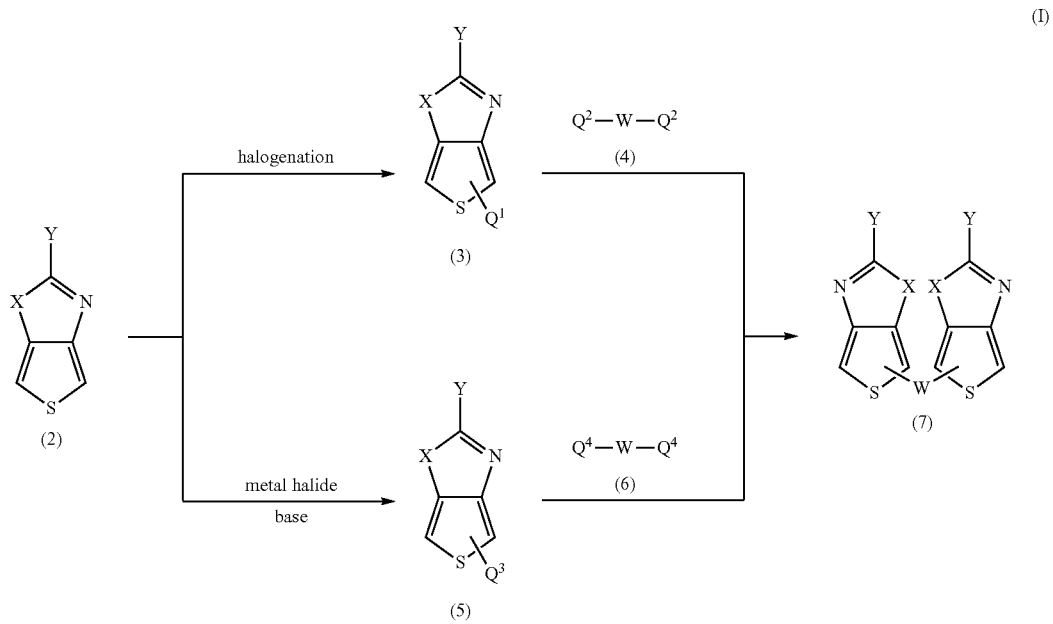

As shown in reaction equation (1), monomer ingredient (7) can be obtained through a cross-coupling reaction between compound (3) and compound (4) or between compound (5) and compound (6). As the cross-coupling reaction, Suzuki reaction, Yamamoto reaction, Heck reaction, Stifle reaction, Sonogashira-Hagihara reaction, Kumada-Corriu reaction, Riecke reaction, McCullogh reaction, etc. are preferably employed.

In a step in which compound (3) is obtained by halogenating compound (2), a halogen atom is introduced into a carbon atom next to the sulfur atom of the thiophene ring group in the compound (2) or in other word, for example, a halogen atom is introduced into an alpha position of X, to obtain compound (3). A pseudo ionic reaction is preferably used to react N-bromosuccinimide, etc. with compound (2) in a polar solvent. If the amount of reagents such as N-bromosuccinimide is unnecessarily over used at the time of introducing a halogen atom, two halogen atoms are each concurrently and respectively introduced into two carbon atoms next to the sulfur atom of the thiophene ring group. Therefore an additional separation and purification process should be set up separately, being inconvenient and complicated. Accordingly, the added amount of reagents such as N-bromosuccinimide, etc. to the compound (2) is preferably in the range of 1 to 1.2 equivalent with respect to the compound (2).

The halogenation reaction is preferably carried out in the presence of solvent. As the solvent, for example, a saturated aliphatic hydrocarbon such as pentane, hexane, heptane, octane, nonane, decane, cyclohexane, etc.; an aromatic hydrocarbon such as benzene, toluene, ethylbenzene, propylbenzene, xylene, ethyltoluene, etc.; an ether such as dimethyl ether, ethylmethyl ether, diethyl ether, dipropyl ether, butylmethyl ether, t-butylmethyl ether, dibutyl ether, tetrahydrofuran, 1,4-dioxane, etc.; an aprotic polar solvent such as dimethylacetamide, dimethylformamide, N-methyl-2-pyrolidone, dimethylsulfoxide, etc. can be exemplified. Specifically, among them, diethylether, tetrahydrofuran, dimethylformamide are preferably used. These solvents can be used alone or in combination of 2 or more of them. The amount of solvent used is preferably 1 to 100 ml, more preferably 2 to 50 ml with respect to 1 mmol of compound (2).

In a step in which compound (5) is obtained, lithiation is carried out to a carbon atom next to the sulfur atom of the thiophene ring group of the compound (2) or, for example, lithiation is carried out to an alpha position of X, and then $Q^3$ group is introduced to obtain compound (5). Specifically, at first, compound (2) is reacted with a basic substance, and then the obtained product is further reacted with a metal halide, a compound which is used for introducing $Q^3$ group. More specifically, in a reacted liquid obtained by the reaction between compound (3) and the basic substance, the metal halide is added to carry out the reaction.

The compound used for introducing $Q^3$ group is not limited to a metal halide. As this compound, trialkyltin halogenide, boronic ester, etc. can be exemplified. When a halogen element is used to introduce $Q^3$ group, there is a need to react with a metal such as Zn or Mg later.

There is no limit for the use of the basic substance, but, for example, an organic lithium compound is preferably used. As specific examples of the organic lithium compounds, for example, an alkyl lithium compound such as methyl lithium, n-butyl lithium, sec-butyl lithium, tert-butyl lithium, etc.; an aryl lithium compound such as phenyl lithium, etc.; an alkenyl lithium compound such as vinyl lithium, etc.; a lithium amide compound such as lithium diisopropylamide, lithium bis(trimethylsilyl)amide, etc. can be exemplified. Among them, preferable basic substance is an alkyl lithium compound. Preferably, 1 to 1.5 equivalent of a basic substance with respect to compound (2), more preferably, 1.05 to 1.2 equivalent, is gradually added to compound (2) under an inert gas atmosphere. At the time of the adding of the basic substance, compound (2) is preferably diluted in advance to a solvent.

The solvent is not specifically limited, however, an ether-base solvent, in particular tetrahydrofuran is preferable. Prior to an addition of the basic substance, the concentration of compound (2) in the reaction solution which contains the solvent is not specifically limited but, preferable concentration is in the range of 1 to 100 ml/mmol, more preferably 2 to 10 ml/mmol. The temperature of the reaction between the compound (2) and the basic substance is not specifically limited, but preferably in the range of −200 to 30° C., more preferably −80 to 10° C.

The cross-coupling reaction is preferably carried out in the presence of solvent. As the solvent, a saturated aliphatic or alicyclic hydrocarbon such as pentane, hexane, heptane, octane, nonane, decane, cyclohexane, etc.; an aromatic hydrocarbon such as benzene, toluene, ethylbenzene, propylbenzene, xylene, ethyltoluene, etc.; an ether such as dimethylether, ethylmethylether, diethylether, dipropylether, butylmethylether, t-butylmethylether, dibuthylether, tetrahydrofran, 1,4-dioxane etc.; an aprotic solvent such as dimethylacetamide, dimethylformamide, N-methyl-2-pyrolidone, dimethylsulfoxide, etc. can be exemplified. The solvent can be used alone or in combination of 2 or more solvents. Among them, the solvent is preferably an ether and/or an aromatic hydrocarbon, more preferably tetrahydrofuran, 1,4-dioxane and/or toluene. The amount of the solvent used here is preferably in the range of 1 to 100 ml with respect to 1 mmol of compound (3) and (5), more preferably 2 to 50 ml.

More specifically, the reaction is carried out by introducing a palladium catalyst such as tetrakis (triphenylphosphine) palladium, trans-dichloro bis(triphenylphosphine)palladium, etc. into 2 kinds of compounds to be cross-coupled; and then the reaction system is heated.

The structural binding sequence of the thus obtained monomer ingredient can be a regioregularly aligned head-tail structure. However, a monomer ingredient having a head-head and/or tail-tail repeating structure can be used.

The π-electron based conjugated polymer can be obtained through polymerization of the thus obtained monomer ingredient using an electrochemical or a chemical oxidative polymerization.

The π-electron based conjugated polymer has a structural unit in which two heterocyclic structures are joined with a spacer group W, so that a π-electron based conjugated polymer having a desired color-developed state can be obtained by selecting the monomer ingredient represented by formula (7) and by changing the kind of W arbitrarily. Accordingly, it is possible to provide a π-electron based conjugated polymer that can change in color from a desired color developed state to a colorless state. The π-electron based conjugated polymer can be preferably used as a raw material for structuring the color developing layer of the EC display element.

The polymerization reaction to obtain the π-electron based conjugated polymer is not specifically limited, however, as an electro polymerization, in which the polymerization is carried out electrochemically, a method which comprises the steps of: preparing a solution in which the monomer ingredient—a polymerization raw material—is dissolved into a solvent or preparing an electrolytic liquid in which a supporting electrolyte is dissolved into the above mentioned solution; and applying voltage to electrodes placed apart in the solution or the electrolytic liquid, thereby an objective polymer or an anodically-oxidized polymer is obtained on the anode, can be preferably adopted. The polymer obtained here usually has a film-like shape. As mentioned above, preferred film is formed as a material for structuring the EC display element, accordingly it becomes possible to produce the EC display element at low cost in high productivity, In addition, adoption of the electropolymerization makes it possible to directly produce an integral member comprising the π-electron based conjugated polymer and the electrode. Such member can be used as it is as a structural member of the EC display element, accordingly, the EC display element can be produced easily, being convenient.

As the solvent used here in the electropolymerization, for example, nitromethane, acetonitrile, propylene carbonate, nitrobenzene, cyanobenzene, o-dichlorobenzene, dimethylsulfoxide, γ-butyrolactone, dimethylether, water, etc. can be exemplified. As the supporting electrolyte, which is used for the electrolytic liquid, for example, a combination of an ion of an alkali metal such as lithium ion, potassium ion, sodium ion, etc. or a cation such as a quaternary ammonium ion, etc. and an anion such as perchlorate ion, boron tetra fluoride ion, phosphorus hexafluoride ion, halogen atom ion, arsenic hexafluoride ion, antimony hexafluoride ion, sulfate ion, hydrogen sulfate ion, can be exemplified. On the other hand, in the electrolytic liquid, for example, as a cation, an ammonium based ion such as an imidazolium salt, a pyridinium salt, etc.; a phosphonium based ion; an inorganic based ion, or a halogen based ion; is used, while, as an anion, for example, a fluoride ion, or a fluorine series ion such as triflate is used. Into an ion liquid containing such cation and anion, the monomer ingredient represented by formula (7) described above is dissolved to obtain the electrolytic liquid.

The content of the monomer ingredient represented by formula (7) described above in the solution or electrolytic liquid can be arbitrarily set up depending on the conditions of a polymerization reaction adopted, but preferably in the range of 0.01 to 10 mol/l, more preferably 0.01 to 0.1 mol/l. Also, the content of the supporting electrolyte in the electrolytic liquid is preferably in the range of 0.01 to 10 mol/l, more preferably 0.1 to 5 mol/l.

The electrode material is not specifically limited, however, for example, a metal such as platinum, gold, nickel, silver etc.; a conductive polymer; a ceramic; a semiconductor; a conductive carbide; such as carbon, conductive diamond, etc.; a metal oxide such as ITO (indium tin oxide), ATO (antimony-doped tin oxide), AZO (aluminum-doped zinc oxide), ZnO, etc. can be used.

A voltage at the time of applying voltage can be arbitrarily set up depending on the polymerization reaction condition adopted, but the preferred voltage is in the range of −3 to 3V with respect to silver/silver chloride reference electrode, more preferably −1.5 to 1.5V. A preferred temperature at the time of applying voltage is in the range of 0 to 80° C., more preferably 15 to 40° C.

A chemically oxidative polymerization in which polymerization is carried out chemically oxidatively, is carried out by, for example, preparing a mixture containing a solvent, a monomer ingredient represented by formula (7), an oxidant comprising a transition metal salt such as ferric chloride ($FeCl_3$), iron perchlorate, copper perchlorate, etc. and a polyanion. Dehydrogenation from the monomer ingredient is taken place in the presence of the oxidant, causing chemical oxidative polymerization, thereby generating the π-electron-based conjugated polymer.

In this chemically oxidative polymerization, the solvent used here is not specifically limited. However, for example, wafer, an aliphatic alcohol, an aliphatic ketone, an aliphatic carboxylic acid ester, an aromatic hydrocarbon, an aliphatic hydrocarbon, a chlorinated hydrocarbon, an aliphatic nitrile, an aliphatic sulfoxide, an aliphatic sulfone, an aliphatic carboxyamide, an araliphatic ether their aqueous solution, and a combination of them, can be exemplified.

The polyanion used here is not specifically limited. However, for example, as a preferred polyanion, a polycarboxylic acid, specifically, a polyacrylic acid, a polymethacryl acid, a sulfonated fluoro resin, and a polymaleic acid, a high molecular weight sulfonic acid, specifically at least one element originated in the group of polystyrene sulfonic acid and polyvinylsulfonic acid, can be included. And the polycarbonic acid and polysulfonic acid may be a copolymer of other monomer (for example, acrylate or styrene) and vinyl carbonic acid and vinyl sulfonic acid. The molecular weight of the acid which supplies the polyanion is usually in the range of about 1,000 to about 500,000, mostly about 2,000 to about 500,000, ordinary about 70,000. The acid that derives the polyanion can be a commercially available one or one that is produced using a publicly known method.

The oxidant used here is not specifically limited, but, for example, as a preferred oxidant, iron (III) salt, specifically, $FeCl_3$, $Fe(ClO_4)_3$; iron(III) salt of organic acid; iron(III) salt of an inorganic acid containing an organic residue; $H_2O_2$; $K_2Cr_2O_7$; an alkali or ammonium persulfate; an alkali perborate; potassium permanganate and a copper salt specifically, at least one element originated in the group of tetrafluoro boric-acid copper, can be included. Further iodine, air, and oxygen may be used as an oxidizer. A persulfate and Iron (III) salt of organic acid and iron (III) salt of inorganic acid containing an organic residue are useful. These salts are useful because they do not have corrosiveness to a substrate formed with ITO or an oxide of aluminum, tantalum or niobium.

As an example of an iron (III) salt of organic acid, a Fe (III) salt of an alkyl sulfonic acid with the carbon numbers 1 to 30, for example, methane sulfonic acid or dodecane sulfonic acid; a carboxylic acid with 1 to 20 aliphatic carbon, for example, 2-ethylhexyl carboxylic acid; an aliphatic series perfluoro carboxylic acid, for example, trifluoroacetic acid and perfluoro octanoic acid; an aliphatic dicarboxylic acid, for example, oxalic acid; and an aromatic sulfonic acid substituted with an alkyl group having a desired carbon number of 1 to 20, for example, benzenesulfonic add, p-toluene sulfonic acid and dodecylbenzenesulfonic acid, and at least one element originated in the group of the mixture of the aforementioned Fe (III) salts of organic acid, can be included. As an example of an iron (III) salt containing an organic residue, an iron (III) salt of a sulfuric monoester of alkanol with a carbon number of 1 to 20, for example, at least one element originated in the group of a Fe (III) salt of lauryl sulfate, can be included.

The chemical oxidation polymerization is broadly divided into a water-containing water phase oxidation polymerization and an oil phase oxidation polymerization which is carried out under substantially no water. Each polymerization is carried out under different reaction conditions.

Typical reaction conditions of the water phase oxidation polymerization are carried out at a temperature of about 0° C. to about 100° C. The polymerization is continued until there is no change in a desired degree of polymerization. The degree of polymerization is not an important factor in the present invention, but can be changed arbitrarily according to an end use. The degree of polymerization is determined depending largely on the end use. It is simply determined by one skilled in the art without excessive experiments. Polymerization time is in the range of from few minutes to 48 hours at maximum. And the size of a reaction vessel, temperature and the amount of oxidant used in the polymerization can be arbitrarily determined based on various factors.

The amount of polyanion and oxidant used in a water phase oxidative polymerization can be selected arbitrarily to cause a desired polymerization without excessive experiments, for example, the mass ratio of a monomer ingredient to polyanion is about 0.01 to about 10, preferably about 0.05 to about 1.0. The weight ratio of the monomer ingredient to oxidant is typically about 0.01 to about 10, preferably about 0.1 to about 2.0. The amount of ferric sulfate used here is about 0.1 to about 5% by mass based on the monomer. Further in another exemplification, in a case of oxidation polymerization, about 2 to about 2.5 equivalent of oxidant per one mole of monomer ingredient is theoretically required, however actually, a certain excess amount (for example, by about 0.1 to about 2 excess equivalent) per 1 mole of the monomer ingredient is usually used.

In an oxidation polymerization of the monomer ingredient in the oil phase that contains substantially no water, the polymerization is usually carried out at a temperature of about 20° C. to about 250° C., preferably about 20° C. to about 200° C. though depending on the oxidant used and reaction time. Like the reaction in the water phase, if another monomer is additionally added, a copolymer can be produced.

A preferred solvent that can be used for solving monomers and oxidants is generally inactive under the aforementioned conditions and at least one element originated in a group described below can be included. As a solvent that can be used here, specifically, an aliphatic alcohol such as methanol, ethanol, and i-propanol; an aliphatic ketone such as acetone and methylethylketone; an aliphatic carboxylic ester such as ethyl acetate and butyl acetate; an aromatic hydrocarbon such as toluene and xylene; an aliphatic hydrocarbon such as hexane, heptane and cyclohexane; a chlorinated hydrocarbon such as dichloromethane and dichloroethane; an aliphatic nitrile such as acetonitrile; an aliphatic sulfoxide and sulfone such as dimethylsulfoxide and sulfolane; an aliphatic carboxamide such as methylacetoamide and dimethylformamide; an araliphatic ether such as diethyl ether and anisole are exemplified.

A composition containing the π-electron based conjugated polymer obtained through these polymerization reactions can be formed into an electrochromic material, through coating, vapor depositing, molding, dissolving, immersing, filling, which can be preferably used, for example, as a raw material for structuring the color developing layers of the EC display element.

The EC display element has at least a pair of electrodes and a layer containing aforementioned π-electron based conjugated polymer is disposed between the electrodes. The shape of the electrode is not specifically limited, but can be arbitrarily designed depending on a desired EC display element. For example, an electrode having a plate shape can be used. Raw material for structuring the electrode is not specifically limited, however, metals, conductive polymers, ceramics, semiconductors, conductive carbons, etc. can be used. In the EC display element system which is designed for an inspector to check the color-developing layer through one of the electrodes, the one of the electrode is preferably transparent. As a raw material that structures the transparent electrode, for example, a metal oxide such as ITO, ATO, AZO, ZnO, etc.; a conductive carbide such as SWCNT (single wall carbon nano tube), DWCNT (double wall carbon nano tube), etc.; a conductive polymer such as PEDOT (poly(ethylene-3,4-dioxythiophene)), a polyaniline derivative, a polypyrrole derivative, etc. can be exemplified.

The layer that contains the π-electron based conjugated polymer may be structured only using the π-electron based conjugated polymer, but another ingredient may be used within a range that does not deteriorate the performance of the EC element. As such another ingredient, for example, a compound which shows chromic characteristics when oxidized or reduced, such as a π-electron conjugated carbide such as SWCNT, DWCNT, fullerene, etc.; viologen or its derivatives, prussian blue or its derivatives, tungsten oxide or its derivatives, can be exemplified. The content of the π-electron based conjugated polymer in the layer that contains π-electron based conjugated polymer is preferably not less than 50% by mass, more preferably, 80% by mass or over.

The outside surface of at least one of the two electrodes, preferably both outside surfaces of the two electrodes is covered by an insulated substrate to protect the electrodes. As the raw material that structures the insulated substrate, for example, glass such as fused quartz, ordinary glass, etc.; ceramics; wood; a synthetic resin, etc. can be exemplified. As the synthetic resin, for example, a polyester such as polyethylene naphthalate, polyethylene terephthalate, etc.; polyamide; polycarbonate, a cellulose ester such as cellulose acetate; polyvinylidene fluoride, a fluoropolymer such as poly (tetrafluoroethylene-co-hexafluoropropylene) etc.; a polyether such as polyoxymethylene, etc.; a polyacetal; polystyrene; a polyolefin such as polyethylene, polypropylene, polymethylpentene, etc.; a polyimide such as polyamide-imide, polyetherimide, etc. can be exemplified. As described above, in the EC display element having a system to let the inspector to check the color developing layer through one of the electrode, the insulatedinsulated substrate which is disposed on the outer side of one transparent electrode is preferably a transparent. The total light transmittance of the insulatedinsulated substrate is preferably 70% or over, more preferably 80% or over. As the raw material that structures the transparent insulatedinsulated substrate, for example, a glass such as fused quartz, ordinary glass, etc.; a polymer such as polystyrene, polymethyl methacrylate, styrene-methyl methacrylate copolymer, polycarbonate, cycloolefin polymer, cycloolefin copolymer, polyethylene terephthalate, polyethylene naphthalate, etc. can be exemplified.

When voltage is applied on a color developing layer containing the π-electron based conjugated polymer, the π-electron based conjugated polymer emits/accepts electron and changes into a polymer having a structure called a quinoid structure. The conjugation length of electron in the π-electron based conjugated polymer is changed and a light absorption wavelength is also changed, thereby an electrochromic phenomenon takes place. To make a polymer have a quinoid structure is called a doping. Since the quinoid structure is a unit that has a charge, an ionic species, which arises from an electrolyte through it dissociation, is generally existing to keep the neutrality of charge in the vicinity of the π-electron based conjugated polymer having a quinoid structure. This ionic species is called a dopant. It is generally known that when doped, an absorption wavelength of the π-electron based conjugated polymer shifts toward a long wavelength side. When the aforementioned π-electron based conjugated polymer, is used in a film for an EC display element or a color developing layer, a color developed state, which appears when de-doped, can changes into a colorless state when doped in which no large light absorption is observed in the visible light region.

The dopant used here is not specifically limited. For example, a halogenated anion of the group 5B elements such as $PF_6^-$, $SbF_6^-$, $AsF_6^-$, etc.; a halogenated anion of the group 3B elements such as $BF_4^-$, etc.; a halogen anion such as $I^-(I_3^-)$, $Br^-$, $Cl^-$, etc.; a halogen acid anion such as $ClO_4^-$, etc.; a metal halide anion such as $AlCl_4^-$, $FeCl_4^-$, $SnCl_5^-$, etc.; a nitrate anion represented by $NO_3^-$; a sulfate anion represented by $SO_4^{2-}$; an organic sulfonic acid anion such as p-toluene sulfonic acid anion, naphthalene sulfonic acid anion, $CH_3SO_3^-$, $CF_3SO_3^-$, etc.; a carboxylic acid anion such as $CF_3COO^-$, $C_6H_5COO^-$, etc.; and a modified polymer, etc. having an above-mentioned anion species in its main chain or side chain, can be exemplified. The dopant can be used alone or in combination of 2 or more. An adding method of the dopant is not specifically limited. However, for example, a method in which in the EC display element, a dopant-containing electrolyte layer is placed adjacent to the above-mentioned π-electron based conjugated polymer, then the dopant is moved close to the π-electron based conjugated polymer by applying voltage at the time the EC display element is operated; or a method in which the dopant is previously contained in the π-electron based conjugated polymer, can be exemplified. The electrolyte can be a solid-like, gell-like or liquid-type one. As will be described later, in the case where the π-electron based conjugated polymer which is electro polymerized on the anode electrode and used as it is as the structural member of the EC display element without removing it from the electrode, the anion originated in the support electrolyte used at the time of polymerization can be used as it is as a dopant. On the other hand, in the case where polymerization is carried out using a chemical oxidative polymerization an anion originated in the oxidant used here can be used as it is as a dopant.

In the EC display element, a spacer is preferably disposed at least at a portion between the pair of electrodes so that it is possible to keep a distance between the electrodes and to prevent a short circuit. As a raw material for structuring the spacer, for example, a resin such as an epoxy resin, an acrylic resin, a polyester resin, a polyether resin, a polyethylene resin, a polyimide resin, etc.; an inorganic oxide and their hybrid materials can be exemplified.

A method for producing the EC display element is not specifically limited. For example, the structural members including, for example, a layer that contains the π-electron based conjugated polymer, an electrode, an insulated substrate, an electrolytic layer, a spacer, etc. are at first prepared respectively. Then these members are structured to produce the EC display element. However, it is preferable that at first a layer that contains the π-electron based conjugated polymer is formed on the electrode, then the EC display element is more easily produced using an integral member comprising the layer and the electrode. The monomer ingredient represented by formula (7) is electropolymerized on the anode electrode when polymerized, and then the obtained π-electron based conjugated polymer is preferably used as it is (together with the anode), as a structuring member of the EC display element, without removing it from the electrode.

The thus obtained π-electron based conjugated polymer produced by using the compound represented by formula (7) can be used for other uses other than the raw material for structuring the EC display element. For example, it can be used for various uses such as a film, fiber, a solid condenser, an organic photoelectric conversion element, a corrosion control paint, a memory device, an organic electric field effect transistor, etc. In addition, in a case where the π-electron based conjugated polymer is doped to make the polymer have a quinoid structure in the vicinity of which the dopant exists, a conductive polymer having a low band gap is obtained, so that it can be preferably used for a use which requires especially a high conductivity.

EXAMPLES

Hereinafter, the present invention will be precisely explained.

Example 1

The synthesis of ethyl 2,4-dimethyl-1,3-thiazole-5-carboxylate represented by formula (8) using thioacetamide and 2-chloroaceto acetate is described below. The ethyl group in the formula is abbreviated to Et hereinafter.

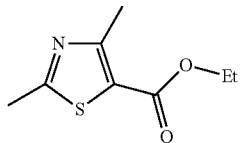
(8)

126 mmol of thioacetamide was dissolved in 378 ml of tetrahydrofuran, then a solution, in which 120 mmol of 2-chloroaceto acetate was dissolved in 36 ml of tetrahydrofuran, was gradually dropped with keeping a temperature at 0 to 10° C. using an ice bath. After the dropping, stirring was continued for 1 hour at a room temperature, then the temperature was heated up to 80° C. and the reaction was continued for 3 hours. The reacted liquid was kept still overnight. A recrystallized solid was filtrated, and dissolved in 50 ml of water. Sodium hydrogen carbonate was added until the pH of the solution reached 8 to 9, the product was extracted and separated into an organic layer using ethyl acetate, then dried under sodium sulfate and the solvent was evaporated out, obtaining ethyl 2,4-dimethyl-1,3-thiazole-5-carboxylate.

$^1$H-NMR spectral data obtained by nuclear magnetic resonance (NMR) spectral measurement of 2,4-dimethyl-1,3-thiazole-5-carboxylate are shown below and support the structure represented by formula (8).

$^1$H-NMR (500 MHz, CDCl$_3$, TMS) δ: 4.30 (2H, dd), 2.69 (3H, s), 2.67 (3H, s), 1.36 (3H, t)

Next, a synthesis of ethyl 4-(bromomethyl)-2-methyl-1,3-thiazol-5-carboxylate represented by formula (9) shown below which was obtained through halogenating ethyl 2,4-dimethyl-1,3-thiazole-5-carboxylate, is described below.

(9)

10 mmol of ethyl 2,4-dimethyl-1,3-thiazole-5-carboxylate was dissolved in 30 ml of carbon tetrachloride, then 11 mmol of N-bromo succinimide was gradually added with keeping a temperature at 20 to 30° C. After the end of the adding, 0.5 mmol of azobis isobutyro nitrile was gradually added. After that, stirring was continued for 30 minutes at room temperature. Then the temperature was heated up to 80° C. to carry out the reaction for 3 hours. The reacted liquid was cooled down to a room temperature. A solid precipitate was filtrated. The filtrate was washed with 30 ml of water, and then an organic layer was separated, extracted and dried under sodium sulfate. Then the solvent was evaporated, obtaining ethyl 4-(bromomethyl)-2-methyl-1,3-thiozole-5-carboxylate.

$^1$H-NMR spectral data of ethyl 4-(bromomethyl)-2-methyl-1,3-thiazole-5-carboxylate are shown below, and support the structure represented by formula (9).

$^1$H-NMR (500 MHz, CDCl$_3$, TMS) δ: 4.91 (2H, s), 4.35 (2H, dd), 2.71 (3H, s), 1.38 (3H, t)

Next, a synthesis of ethyl 4-(mercapto methyl)-2-methyl-1,3-thiazole-5-carboxylate represented by formula (10) shown below which was obtained through thiolation of ethyl 4-(bromomethyl)-2-methyl-1,3-thiazole-5-carboxylate, is described below.

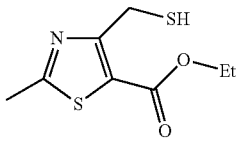
(10)

5 mmol of ethyl 4-(bromomethyl)-2-methyl-1,3-thiazole-5-carboxylate was dissolved in 50 ml of ethanol, then 5.5 mmol of thioacetoamide was added, and the temperature was heated up to 95° C. to carry out the reaction for 4 hours. The reacted liquid was cooled down to a room temperature. Ethanol was evaporated out and then purification was carried out using column separation method with solvents of ethylacetate and hexane, obtaining ethyl 4-(mercaptomethyl)-2-methyl-1, 3-thiazole-5-carboxylate.

$^1$H-NMR spectral data of ethyl 4-(mercaptomethyl)-2-methyl-1,3-thiazole-5-carboxylate are shown below and support the structure represented by formula (10).

$^1$H-NMR (500 MHz, CDCl$_3$, TMS) δ: 4.33 (2H, dd), 4.16 (2H, d), 2.69 (3H, s), 2.20 (1H, t), 1.37 (3H, t)

Next, a synthesis of 4-(mercaptomethyl)-2-methyl-1,3-thiazole-5-carbaldehyde represented by formula (11) shown below which was obtained through partially reducing ethyl 4-(mercatomethyl)-2-methyl-1,-3-thiazole-5-carboxylate, is described below.

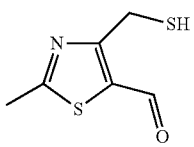
(11)

105 mmol of sodium 1-butoxide was dissolved in 100 ml of dried tetrahydrofuran, then 100 ml of 1.0M of hydrogenated diisobutylaluminum 1 hexane solution was gradually added with keeping a temperature at 0 to 10° C. using an ice bath. After the dropping, the reaction was carried out for 2 hours at a room temperature. Thus 0.5M sodium diisobutyl-t-butoxyalminum hydride (SDBBA) solution was prepared.

10 mmol of ethyl 4-(mercaptomethyl)-2-methyl-1,3-thiazole-5-carboxylate was dissolved in 100 ml of dried tetrahydrofuran, then 42 ml of 0.5M SDBBA solution was gradually added with keeping the temperature at −30 to −20° C. After the adding, the reaction was carried out for 4 hours at −20° C. Then 20 ml of water was added into the reaction system to stop the reaction and then an organic layer was separated. To the remaining water phase, sodium hydrogen carbonate was added until the pH of the water phase reached a value of 8 to 9. The product was extracted and separated into an organic layer using ethyl acetate. This organic layer and the previous organic layer were mixed together and dried under sodium sulfate. The solvent was evaporated out and then the product was purified using a column separation with solvents of ethylacetate and hexane, obtaining 4-(mercaptomethyl)-2-methyl-1,3-thiazole-5-carbaldehyde.

$^1$H-NMR spectral data of 4-(mercaptomethyl)-2-methyl-1, 3-thiazole-5-carbaldehyde are shown below and support the structure represented by formula (II).

$^1$H-NMR (500 MHz, CDCl$_3$, TMS) δ: 9.87 (1H, s), 4.07 (2H, s), 2.77 (3H, s), 2.20 (1H, t)

Next, a synthesis of 2-methylthieno[3,4-d][1,3]thiazole represented by formula (12) shown below which was obtained using 4-(mercaptomethyl)-2-methyl-1,3-thiazole-5-carbaldehyde, is described below.

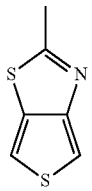

(12)

5 mmol of 4-(mercaptomethyl)-2-methyl-1,3-thiazole-5-carbaldehyde was dissolved in 50 ml of ethanol, then 50 mmol of acetic acid was added, and stirring was continued for 1 hour at a room temperature. Then the temperature was heated up to 80° C. to carry out the reaction for 4 hours. The reacted liquid was cooled down to a room temperature. The solvent was evaporated out and then purification was carried out using column separation with solvents of ethylacetate and hexane, obtaining 2-methylthieno[3,4-d][1,3]thiazole.

$^1$H-NMR spectral data of 2-methylthieno[3,4-d][1,3]thiazole are shown below and support the structure represented by formula (10).

$^1$H-NMR (500 MHRz, CDCl$_3$, TMS) δ: 7.45 (1H, d), 7.16 (1H, d), 2.73 (3H, s)

$^{13}$C-NMR (500 MHz, CDCl$_3$, TMS) δ: 173.46, 159.94, 134.62, 109.73, 109.34, 21.21

Next, a synthesis of 6-bromo-2-methylthieno[3,4-d][1,3]thiazole represented by formula (13) shown below which was obtained using 2-methylthieno[3,4-d][1,3]thiazole, is described below.

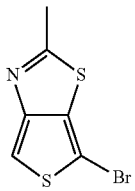

(13)

1 mmol of 2-methylthieno[3,4-d][1,3]thiazole represented by formula (12) was dissolved in 10 ml of tetrahydrofuran and kept at −78° C. in a methanol-bath cooled by dry ice. Into this solution, a solution comprised of 1.05 mmol of N-bromosuccinimide and 5 ml of tetrahydrofran was gradually added dropwise. After two hours reaction, an excess amount of a saturated sodium chloride aqueous solution was added to stop the reaction. The reacted liquid was washed with water, and the organic layer was recovered and dried under sodium sulfate. The solvent was evaporated out and then purification was carried out using column separation method with solvents of ethylacetate and hexane, obtaining 6-bromo-2-methylthieno[3,4-d][1,3]thiazole represented by formula (13).

$^1$H-NMR spectral data of 6-bromo-2-methylthieno[3,4-d][1,3]thiazole are shown below and support the structure represented by formula (13).

$^1$H-NMR (500 MHz, CDCl$_3$, TMS) δ: 715 (1H, s), 2.73 (3H, s)

A synthesis of 9-methyl-3,6-bis(2-methylthieno[3,4-d][1,3]thiazole-6-yl)-9H-carbazole represented by formula (14) which was obtained through Stille cross-coupling reaction using 6-bromo-2-methylthieno[3,4d][1,3]thiazole and 3,6-ditributhyltin-9-methyl-9H-carbazole, is described below.

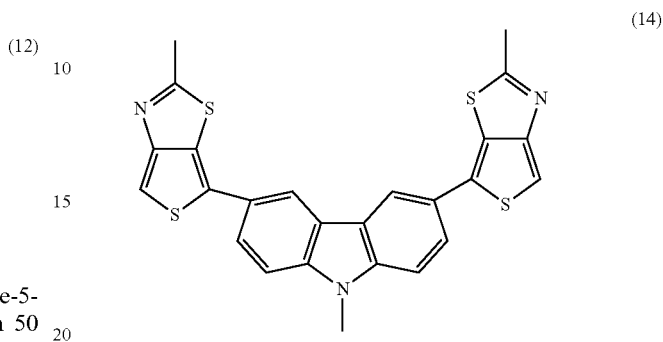

(14)

3,6-dibromo-9-methyl-9H-carbazole was dissolved in 2 ml/mmol of dried tetrahydrofuran and kept at −78° C. in a methanol bath cooled by dry ice. Under argon gas environment, 1.1 equivalent of 1.6N normal-butyl lithium/hexane solution was gradually added dropwise to 3,6-dibromo-9-methyl-9H-carbazole and reacted for 30 minutes. Then 1.0 equivalent of tributyltin chloride was added and reacted for 1 hour. Furthermore, same amount of 1.6N n-butyl lithium/hexane solution was gradually added dropwise into the reaction solution and carried out for 30 minutes. Then same amount of 1.0 equivalent of tributyltin chloride was gradually added dropwise into the reaction solution and carried out for 1 hour. Then, an excess amount of a saturated sodium chloride aqueous solution was added and reacted for 1 hour to stop the reaction. The reacted liquid was washed three times with saturated sodium chloride aqueous solution. The product was separated and extracted into an organic layer using hexane and dried under sodium sulfate. The solvent was evaporated out, obtaining 3,6-ditributyltin-9-methyl-9H-carbazole.

2.0 equivalent of 6-bromo-2-methylthieno[3,4-d][1,3] thiazole represented by formula (13), 5 ml/mmol of dried 1,4-dioxane, and 0.2 equivalent of trans-dichloro bis(triphenylphosphine) palladium were added to 3,6-ditributyltin-9-methyl-9H-carbazole. Refluxing and reaction were carried out for 40 hours at 130° C. under argon gas environment. An excess amount of saturated ammonium chloride aqueous solution was added to stop the reaction. From the obtained reacted liquid, products was extracted into an organic layer using ethylacetate, and dried under sodium sulfate. The solvent was evaporated out and the product was purified using column separation with solvents of ethylacetate and hexane, obtaining 9-methyl-3,6-bis (2-methylthieno[3,4-d][1,3]thiazole-6-yl)-9H-carbazole represented by formula (14) shown above.

$^1$H-NMR spectral data of 9-methyl-3,6-bis (2-methylthieno[3,4-d][1,3]thiazole-6-yl)-9H-carbazole are shown below and support the structure represented by formula (14).

$^1$H-NMR (500 MHz, CDCl$_3$, TMS) δ: 7.05 (2H, s), 8.76 (2H, d), 8.26 (2H, d), 7.47 (2H, s) 3.90 (3H, s), 2.82 (6H, s)

Example 2

A synthesis of 2-methyl-6-[7-(2-methylthieno[3,4-d][1,3] thiazole-6-yl)-2,3-dihydrothieno[3,4-b][1,4]dioxin-5-yl] thieno[3,4-d][1,3]thiazole represented by formula (15) shown below, which was obtained through Stille cross-coupling reaction using 6-bromo-2-methylthieno[3,4-d][1,3]thiazole represented by formula (13) and 5,7-ditributyltin-2,3-dihydrothieno[3,4-b][1,4]dioxin, is described below.

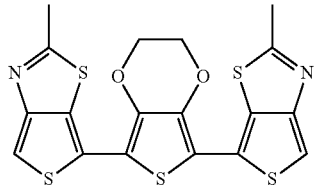

(15)

2,3-dihydrothieno[3,4-b][1,4]dioxin was dissolved in 2 ml/mmol of dried tetrahydrofuran and kept at −78° C. in a methanol bath cooled by dry ice. Under argon gas environment, 1.1 equivalent of 1.6N n-butyllithium/hexane solution was gradually added dropwise to 2,3-dihydrothieno[3,4-b][1,4]dioxin and reacted for 30 minutes. Then 1.0 equivalent tributyltin chloride was gradually added dropwise and the reaction was carried out for 1 hour. Furthermore, same amount of 1.6N n-butyl lithium/hexane solution was gradually added dropwise into the reaction solution and carried out for 30 minutes. Then same amount of 1.0 equivalent of tributyltin chloride was gradually added dropwise into the reaction solution and carried out for 1 hour. Then, an excess amount of a saturated sodium chloride aqueous solution was added and reacted for 1 hour to stop the reaction. The reacted liquid was washed three times with the saturated sodium chloride aqueous solution. The products was extracted into an organic layer and dried under sodium sulfate. The solvent was evaporated out, obtaining 5,7-ditributyltin-2,3-dihydrothieno[3,4-b][1,4]dioxin.

2.0 equivalent of 6-bromo-2-methylthieno[3,4-d][1,3]thiazole represented by formula (13), 5 ml/mmol of dried 1,4-dioxin and 0.2 equivalent of trans-dichloro bis triphenylphosphine palladium were added to 5,7-ditributyltin-2,3-dihydrothieno[3,4-b][1,4]dioxin. Refluxing and reaction were carried out for 40 hours at 130° C. under argon gas environment. An excess amount of saturated ammonium chloride aqueous solution was added to stop the reaction. From the obtained reacted liquid, a product was extracted into an organic layer using ethyl acetate, and dried under sodium sulfate. The solvent was evaporated out and the product was purified using column separation with solvents of ethyl acetate and hexane, obtaining 2-methyl-6-[7-(2-methylthieno[3,4-d][1,3]thiazole-6-yl)-2,3-dihydrothieno[3,4-b][1,4]dioxin-5-yl]thieno[3,4-d][1,3]thiazole.

¹H-NMR spectral data of 2-methyl-6-[7-(2-methylthieno[3,4-d][1,3]thiazole-6-yl)-2,3-dihydrothieno[3,4-b][1,4]dioxin-5-yl]thieno[3,4-d][1,3]thiazole are shown below and support the structure represented by formula (15).

¹H-NMR (500 MHz, CDCl₃, TMS) δ: 7.36 (2H, s), 4.37 (2H, m), 4.29 (2H, m), 2.74 (6H, s)

Example 3

A synthesis of ethyl 2,4-dimethyl-1,3-oxazole-5-carboxylate represented by formula (16) shown below which was obtained using acetoamide and 2-ethylchloroaceto acetate, is described below.

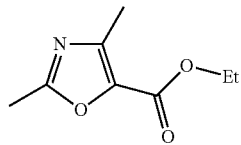

(16)

800 mmol of acetoamide and 400 mmol of ethylchloroaceto acetate were dissolved into 146 g of anhydrous acetic acid. Reaction was carried out for 10 hours at 130° C. The reacted liquid was alkalized with saturated sodium hydrogen carbonate and then the product was extracted into an organic phase using ethyl acetate. The organic phase was dried under sodium sulfate and then the solvent was evaporated out, obtaining a black liquid. To this black liquid 6N hydrochloric acid aqueous solution was added to make it alkaline. Then the product was extracted into organic phase using ethyl acetate. The thus obtained solid substance was dissolved in hexane. Insoluble matter was eliminated and solvent was evaporated out, obtaining ethyl 2,4-dimethyl-1,3-oxazole-5-carboxylate, an yellowish white solid (yield: 30%).

¹H-NMR spectral data of ethyl 2,4-dimethyl-1,3-oxazole-5-carboxylate are shown below and support the structure represented by formula (16).

¹H-NMR (500 MHz, CDCl₃, TMS) δ: 4.38 (2H, dd), 2.49 (3H, s), 2.43 (3H, s), 1.39 (3H, t)

Next, a synthesis of ethyl 4-(bromomethyl)-2-methyl-1,3-oxazole-5-carboxylate represented by formula (17) shown below which was obtained through halogenating ethyl 2,4-dimethyl-1,3-oxazole-5-carboxylate, is described below.

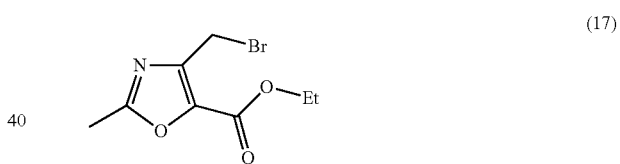

(17)

10 mmol of ethyl 2,4-dimethyl-1,3-oxazole-5-carboxylate was dissolved in 30 ml of carbon tetrachloride, then 11 mmol of N-bromosuccinimide was gradually added with keeping the temperature at 20 to 30° C. After the end of the adding, 0.5 mmol of azobisiso butyronitrile was gradually added. Then stirring was continued for 30 minutes at a room temperature. The temperature was heated up to 80° C. to carry out the reaction for 3 hours. The reacted liquid was cooled down to a room temperature. A precipitated solid matter was eliminated by filtration. The filtrate was washed with 30 ml of water and the organic phase was separated and extracted and dried under sodium sulfate. Then the solvent was evaporated out, obtaining ethyl 4-(bromo methyl)-2-methyl-1,3-oxazole-5-carboxylate.

¹H-NMR spectral data of ethyl 4-(bromomethyl)-2-methyl-1,3-oxazole-5-carboxylate are shown below and support the structure represented by formula (17).

¹H-NMR (500 MHz, CDCl₃, TMS) δ: 4.64 (2H, s), 4.41 (2H, dd), 2.53 (3H, s), 1.42 (3H, s)

Next, a synthesis of ethyl 4-(mercaptomethyl)-2 methyl-1,3-oxazole-5-carboxylate represented by formula (18) which was obtained through thiolation of ethyl 4-(bromomethyl)-2-methyl-1,3-oxazole-5-carboxylate, is described below.

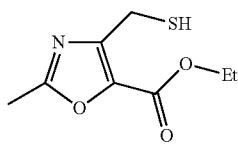

(18)

5 mmol of ethyl 4-(bromomethyl)-2-methyl-1,3-oxazole-5-carboxylate was dissolved in 50 ml of ethanol, then 5.5 mmol of thioacetoamide was added, then heated up to 90° C. to carry out the reaction for 4 hours. The reacted liquid was cooled down to a room temperature. Ethanol is evaporated out and then the product was purified using column separation with solvents of ethyl acetate and hexane, obtaining ethyl 4-(mercaptomethyl)-2-methyl-1,3-oxazole-5-carboxylate (yield 95%).

$^1$H-NMR spectral data of ethyl 4-(mercaptomethyl)-2-methyl-1,3-oxazole-5-carboxylate are shown below and support the structure represented by formula (18).

$^1$H-NMR (500 MHz, CDCl$_3$, TMS) δ: 4.40 (2H, dd), 3.90 (2H, d) 2.52 (3H, s), 2.09 (1H, t), 1.40 (3H, t)

Next, a synthesis of 4-(mercaptomethyl)-2-methyl-1,3-oxazole-5-carbaldehyde represented by formula (19) which was obtained through partially reducing ethyl 4-(mercaptomethyl)-2-methyl-1,3-oxazole-5-carboxylate, is described below.

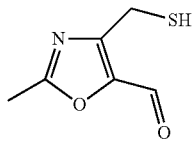

(19)

105 mmol of t-butoxysodium was dissolved in 100 ml of dried tetrahydrofuran, then 100 ml of 1.0M diisobutyl aluminum hydride/hexane solution was gradually added with keeping the temperature at 0 to −10° C. in ice bath. After the end of the adding, reaction was carried out for 2 hours at a room temperature, preparing a 0.5M SDBBA solution.

10 mmol of ethyl 4-(mercaptomethyl)-2-methyl-1,3-oxazole-5-carboxylate was dissolved in 100 ml of dried tetrahydrofuran, then 42 ml of the 0.5M SDBBA solution was gradually added with keeping the temperature at −30 to −20° C. After the adding, reaction was carried out for 4 hours at −20° C. Then 20 ml of wafer was added into the reaction system to stop the reaction and then an organic layer was separated. To the remaining water phase, sodium hydrogen carbonate was added until the pH of the water phase reached 8 to 9. The product was extracted and separated into an organic layer using ethyl acetate. This organic layer and the previously obtained organic layer were combined together and dried under sodium sulfate. The solvent was evaporated out and then the product was purified using a column separation with solvents of ethyl acetate and hexane, obtaining 4-(mercaptomethyl)-2-methyl-1,3-oxazole-5-carbaldehyde.

$^1$H-NMR spectral data of 4-(mercaptomethyl)-2-methyl-1,3-oxazole-5-carbaldehyde are shown below and support the structure represented by formula (19).

$^1$H-NMR (500 MHz, CDCl$_3$, TMS) δ: 9.84 (1H, s), 3.89 (2H, d), 2.56 (3H, s), 2.20 (1H, t)

Next, a synthesis of 2-methylthieno[3,4-d][1,3]oxazole represented by formula (20) shown below which was obtained through using 4-(mercaptomethyl)-2-methyl-1,3-oxazole-5-carbaldehyde, is described below.

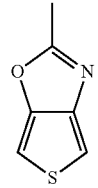

(20)

5 mmol of 4-(mercaptomethyl)-2-methyl-1,3-oxazole-5-carbaldehyde was described in 50 ml of ethanol, then 50 mmol of acetic acid was added. Stirring was continued for 1 hour at a room temperature and the temperature was heated up to 80° C. to carry out the reaction for 4 hours. The reacted liquid was cooled down to a room temperature and the solvent was evaporated out. The product was purified using column separation with the solvents of ethylacetate and hexane, obtaining 2-methylthieno[3,4-d][1,3]oxazole.

$^1$H-NMR spectral data of 2-methylthieno[3,4-d][1,3]oxazole are shown below and support the structure represented by formula (20).

$^1$H-MMR (500 MHz, CDCl$_3$, TMS) δ: 6.98 (1H, d), 6.69 (1H, d), 2.70 (3H, s)

Next, a synthesis of 6-bromo-2-methylthieno[3,4-d][1,3]oxazole represented by formula (21) which was obtained through using 2-methylthieno[3,4-d][1,3]oxazole, is described below.

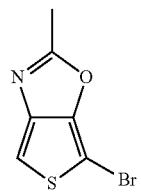

(21)

1 mmol of 2-methylthieno[3,4-d][1,3]oxazole was dissolved in 10 ml of tetrahydrofuran and the temperature was kept at −78° C. in a methanol bath cooled by dry ice. A solution in which 1.05 mmol of N-bromosuccinimide was dissolved in 5 ml of tetrahydrofuran was gradually added dropwise to carry out the reaction for 2 hours. Then an excess amount of saturated sodium chloride aqueous solution was added to stop the reaction. The reacted liquid was washed with water. Then the organic layer was recovered and dried under sodium sulfate. The solvent was evaporated out. The product was purified using column separation with the solvent of ethylacetate and hexane, obtaining 6-bromo-2-methylthieno[3,4-d][1,3]oxazole represented by formula (21).

$^1$H-NMR spectral data of 6-bromo-2-methylthieno[3,4-d][1,3]oxazole are shown below and support the structure represented by formula (21).

$^1$H-NMR (500 MHz, CDCl$_3$, TMS) δ: 6.68 (1H, s), 2.70 (3H, s)

A synthesis of 2-methyl-6-[7-(2-methylthieno[3,4-d][1,3]oxazole-6-yl)-2,3-dihydrothieno[3,4-b][1,4]dioxin-5-yl]thieno[3,4-d][1,3]oxazole represented by formula (22) shown below which was obtained through Stille cross-coupling reaction using 6-bromo-2-methylthieno[3,4-d][1,3]oxazole and 5,7-ditributyltin-2,3-dihydrothieno[3,4-b][1,4]dioxin, is described below.

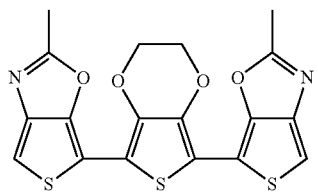

(22)

2,3-dihydrothieno[3,4-b][1,4]dioxin was dissolved in 2 ml/mmol of dried tetrahydrofuran and kept at −78° C. in a methanol bath cooled by dry ice. Under argon gas environment, 1.1 equivalent of 1.6N n-butyl lithium/hexane solution was gradually added dropwise to 2,3-dihydrothieno[3,4-b][1,4]dioxin and reacted for 30 minutes. Then 1.0 equivalent of tributyltin chloride was added and reacted for 1 hour. Furthermore, same amount of 1.6N n-butyl lithium/hexane solution was gradually added dropwise into the reaction solution and carried out for 30 minutes. Then same amount of 1.0 equivalent of tributyltin chloride was gradually added dropwise into the reaction solution and carried out for 1 hour. Then, an excess amount of a saturated sodium chloride aqueous solution was added and reacted for 1 hour to stop the reaction. The reacted liquid was washed three times with saturated sodium chloride aqueous solution. The product was separated and extracted into an organic layer using hexane and dried under sodium sulfate. The solvent was evaporated out, obtaining 5,7-ditributyltin-2,3-dihydrothieno[3,4-b][1,4]dioxin.

2.0 equivalent of 6-bromo-2-methylthieno[3,4-d][1,3]oxazole, 5 ml/mmol of dried 1,4-dioxane, and 0.2 equivalent trans-dichloro bistriphenyl phosphine palladium were added to 5,7-ditributyltin-2,3-dihydrothieno[3,4-b][1,4]dioxin. Refluxing and reaction were carried out for 40 hours at 130° C. under argon gas environment. An excess amount of saturated ammonium chloride aqueous solution was added to stop the reaction. From the obtained reacted liquid, product was extracted into an organic layer using ethylacetate, and then dried under sodium sulfate. Then the solvent was evaporated out and the product was purified using column separation with solvents of ethyl acetate and hexane, obtaining 2-methyl-6-[7-(2-methylthieno[3,4-d][1,3]oxazole-6-yl)-2,3-dihydrothieno[3,4-b][1,4]dioxin-5-yl]thieno[3,4-d][1,3]oxazole.

$^1$H-NMR spectral data of 2-methyl-6-[7-(2-methylthieno[3,4-d][1,3]oxazole-6-yl)-2,3-dihydrothieno[3,4-b][1,4]dioxin-5-yl]thieno[3,4-d][1,3]oxazole are shown below and support the structure represented by formula (22).

$^1$H-NMR (500 MHz, CDCl$_3$, TMS) δ: 6.89 (2H, s), 4.37 (2H m), 4.29 (2H, m), 2.71 (6H, s)

Example 4

9-methyl-3,6-bis(2-methylthieno[3,4-d][1,3]thiazole-6-yl)-9H-carbazole which was obtained in Example 1 was dissolved in 0.1M tetrabutyl ammonium perchlorate/propylene carbonate solution to prepare a 0.01M monomer-containing electrolytic solution.

An ITO electrode (produced by Geomatec Kabushiki Kaisha.) and a platinum electrode (produced by Kabushiki Kaisha Nilaco) were used as an anode and cathode respectively and voltage was applied in a range of −0.5 to 1.40 V with respect to an reference electrode of silver/silver chloride at a sweep rate of 100 mV/sec to cause an electrochemical polymerization, and accordingly to form a polymer film comprising the compound on the ITO electrode. Next, a voltage which was applied on the ITO electrode was shifted to −0.5V. This point is named as a color developed state or de-doped state. Further, a point where the voltage of 1.4 V was applied on the ITO electrode is named as a colorless state or a doped state. Electro chromic characteristics of the present polymer were evaluated by measuring UV-Vis spectrum (Ultraviolet-visible absorption spectrum).

It was confirmed that at the time of color developing state or de-doped state, it displayed a magenta color having an absorption maximum at around 500 nm wavelength, while at the time of colorless state or doped state, no absorption maximum was observed in the visible light region.

Example 5

A polymer was obtained in the same manner as described in Example 4 except that 2-methyl-6-[7-(2-methylthieno[3,4-d][1,3]thiazole-6-yl)-2,3-dihydrothieno[3,4-b][1,4]dioxin-5-yl]thieno[3,4-d][1,3]thiazole, which was obtained in Example 2, was used. The electrochromic characteristics of the polymer were evaluated by measuring its UV-Vis spectrum at its color-developed and colorless states in the same manner as described in Example 4.

It was confirmed that at its color-developed state or de-doped state, it become cyan and had an absorption maximum at around 650 nm, while at its colorless state or doped state, no absorption maximum was observed in the visible light region.

Example 6

A polymer was obtained in the same manner as described in Example 4 except that 2-methyl-6-[7-(2-methylthieno[3,4-d][1,3]oxazole-6-yl)-2,3-dihydrothieno[3,4-b][1,4]dioxin-5-yl]thieno[3,4-d][1,3]oxazole, which was obtained in Example 3, was used. The electrochromic characteristics of the polymer were evaluated by measuring its UV-Vis spectrum at its color-developed and colorless states in the same manner as described in Example 4.

It was confirmed that at its color developed state or de-doped state, it become light cyan and had an absorption maximum at around 750 nm, while at its colorless state or doped state, no absorption maximum was observed in the visible light region.

Example 7

Into a solution in which 0.36 mmol of 9-methyl-3,6-bis(2-methylthieno[3,4-d][1,3]thiazole-6-yl)-9H-carbazole obtained in Example 1 and 830 mg of 18% poly(styrene sulfonic acid) aqueous solution in 10 ml of ion-exchanged water were being stirred, 113.0 mg (0.48 mmol) of (NH4)2S2O8 and 2 mg of Fe2(SO4)3 were added. Oxidation polymerization was carried out for over 1 hour. After the polymerization, the aqueous solution was purified using an ion exchange column, obtaining a π-electron based conjugated polymer/poly(styrene sulfonic acid) aqueous dispersion liquid. A film for evaluating the electrochromic characteristics was prepared by spin-coating the π-electron based conjugated polymer/poly(styrene sulfonic acid) mixture on ITO glass substrate produced by Geomatec Kabushiki Kaisha at a revolution speed of 1,000 rpm using the obtained aqueous dispersion liquid.

A cell for evaluating the electrochromic characteristics was structured using: an ITO electrode on which this film was deposited as an anode; a platinum electrode which is produced by Kabushiki Kaisha Nilaco as a cathode; and a silver/silver chloride electrode as the reference electrode. A voltage applied to the ITO electrode was set to −0.5V with respect to the cell. This state is called a color developed state or de-doped state. A state the voltage of 1.4V is applied on the ITO electrode is called a colorless state or doped state. At the color developed state and colorless state, UV-Vis spectrum was measured to evaluate the electrochromic characteristics of the polymer.

It was confirmed that at its color developed state or de-doped state, it became magenta and had an absorption maximum at around 500 nm, while at its colorless state or doped state, no absorption maximum was observed in the visible light region.

Example 8

A polymer was obtained in the same manner as described in Example 7 except that 2-methyl-6-[7-(2-methylthieno[3,4-d][1,3]thiazole-6-yl)-2,3-dihydrothieno[3,4-b][1,4]dioxin-5-yl]thieno[3,4-d][1,3]thiazole obtained in Example 2 was used. The electrochromic characteristics of this polymer were evaluated by measuring its UV-Vis spectrum at its color-developed and colorless states in the same manner as described in Example 7.

It was confirmed that at its color-developed state or de-doped state, it became cyan and had an absorption maximum at around 650 nm, while at its colorless state or doped state, no absorption maximum was observed in the visible light region.

Comparative Example 1

A polymer was obtained in the same manner as described in Example 4 except that 2-methylthieno[2,4-d][1,3]thiazole represented by formula (12) was used. The electrochromic characteristics of this polymer were evaluated by measuring its UV-Vis spectrum at its color-developed and colorless states in the same manner as described in Example 4.

It was confirmed that at its color-developed state or de-doped state, it became light cyan and had an absorption maximum at around 800 nm, while at its colorless state or doped state, no absorption maximum was observed in the visible light region.

From these results, the π-electron based conjugated polymer having only a structural unit of 2-methylthieno[3,4-d][1,3]thiazole represented by formula (12) produced an unclear color so that it is not suitable for an electrochromic material. However, as is shown in formula (7), when an arylene group which may have a substituent or a divalent hetero aromatic ring group which may have a substituent is contained as a structural unit of the polymer, various colors such as brilliant magenta and cyan can be produced as shown in Examples described above.

Comparative Example 2

2-methylthieno[3,4-d][1,3]thiazole represented by formula (12) and 9-methyl-9H carbazole was mixed in a mole ratio of 1:1. The mixture was dissolved to have concentration of 0.01M, in a 0.1M tetrabutyl ammonium perchlorate/propylene carbonate solution, preparing a monomer-containing electrolytic liquid obtained here was used. A polymer was obtained in the same manner as described in Example 4 except that the monomer containing electrolytic solution obtained here was used. The electrochromic characteristics of the polymer obtained here were evaluated by measuring its UV-Vis spectrum at its color developed and colorless states in the same manner as described in Example 4.

It was confirmed that at its color developed state or de-doped state, it become light cyan and had an absorption maximum at around 800 nm, while at its colorless state or doped state, no absorption maximum was observed in the visible light region.

From these results, it is clear that the π-electron based conjugated polymer produced here only had a structural unit of 2-methylthieno[3,4-d][1,3]thiazole represented by formula (12), but not had a structural unit of 9-methyl-3,6-bis (2-methylthieno[3,4-d][1,3]thiazole-6-yl)-9H-carbazole. In other word, it is cleared that in the present invention, as is shown in formula (7), preparation of a monomer previously containing an arylene group which may have a substituent or a monomer previously containing a divalent hetero aromatic ring group which may have a substituent, as a structural unit, makes it possible to develop various colors such as brilliant magenta or cyan as is shown in Examples.

Comparative Example 3

2-methylthieno[3,4-d][1,3]thiazole represented by formula (12) and 2,3-dihydrothieno[3,4-b]-1,4-dioxin were mixed in a mole ratio of 1:1. The mixture was dissolved, to have a concentration of 0.01M, in a 0.1M tetra butyl ammonium perchlorate/propylene carbonate solution, preparing a monomer-containing electrolytic liquid A. On the other hand, 2-methyl-6-[7-(2-methylthieno[3,4-d][1,3]thiazole-6-yl)-2,3-dihydrothieno[3,4-b][1,4]dioxin-5-yl]thieno[3,4-d][1,3]thiazole was dissolved, to have a concentration of 0.01M, in a 0.1M tetra butyl ammonium perchlorate/propylene carbonate solution, preparing a monomer-containing electrolytic liquid B.

These solutions, an ITO electrode (produced by Geomatec Co.) as an anode, and a platinum electrode (produced by Kabushiki Kaisha Nilaco) as a cathode were used, and current was applied for 1 minute at each different potential of 0V, 0.5V, 1.0V and 1.5V to cause an electrochemical polymerization, and accordingly to form a polymer film comprising the compound on the ITO electrode (anode). Next, a voltage which was applied on the ITO electrode was shifted to −0.5V. This point is named as a color developed state (or de-doped state). Further, a point where the voltage of 1.3V was applied on the ITO electrode (anode) is named as a colorless state (or a doped state). Electrochromic characteristics of the polymers were evaluated by visually checking the color developed state and colorless state. The results are shown in Table 1.

TABLE 1

| | Monomer-containing electrolytic liquid A | | | Monomer-containing electrolytic liquid B | | |
|---|---|---|---|---|---|---|
| | Film formation | Color developed state | Colorless state | Film formation | Color developed state | Colorless state |
| 0 V | a | navy blue | light blue | b | | |
| 0.5 V | a | navy blue | light blue | b | | |
| 1.0 V | a | blue | light gray | a | cyan | transparent |
| 1.5 V | a | blue | light gray | a | cyan | transparent |

In Table 1, the letter "a" shows that a polymer was formed on the ITO electrode, and the letter "b" shows that a polymer was not formed on the ITO electrode or was formed too thin to be able to visually check the color of the film.

As shown in Table 1, there was a difference in the color at the color developed state and colorless state of the polymers obtained from the monomer containing electrolytic liquids A and B, and under different electrochemical polymerization potentials. In the case of the monomer-containing electrolytic liquid A, the electrolytic polymerization was carried out using the mixed monomer solution of 2-methylthieno[3,4-b][1,3]thiazole (hereinafter abbreviated to T) and 2,3-dihydrothieno[3,4-b]-1,4-dioxin (hereinafter abbreviated to E). Therefore, it is considered that electrochemically polymerized film has different composition because T and E have each a different polymerization potential. Specifically, for example, chances of having repeating patterns such as T-E-T-E . . . , T-E-E-T . . . , T-E-E-E-T . . . , etc. are high. Accordingly, in a case where a mixture of different monomers such as monomer-containing electrolytic liquid A is electrochemically polymerized, a film having different color tone is likely to be produced when polymerized under different electro polymerization potential. It is difficult to control the color tone of the film, so that the film is not suitable for the EC material. On the other hand, in a case where a previously controlled monomer unit such as T-E-T, like the monomer-containing electrolytic liquid B is used, difference in color tone due to a polymerization potential is not observed and accordingly, previously controlled monomer unit is preferably used as the EC material. In a case of mixture of different monomers like the monomer-containing electrolytic liquid A, E in the combination of T and E should be a polymerizable unit. However, in a case where the monomer units are controlled in advance, like T-E-T or a monomer-containing electrolyte liquid B, it is not necessary that the portion E itself is polymerizable, therefore wide variety of units that can be used for controlling the color tone, can be used, being very preferable for the EC material.

INDUSTRIAL APPLICABILITY

The electrochromic material of the present invention is useful for a display device capable of developing in full color using an EC display element, and can be used as an electronic paper and a reflecting type display.

What is claimed is:

1. An electrochromic material comprising a π-electron based conjugated polymer represented by formula (1) shown below:

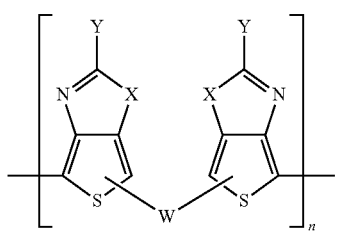
(1)

where in the formula (1):
each X is respectively any one selected from —S—, —O—, —Se— and —Te—;
each Y is respectively any one selected from a hydrogen atom and an organic group having 1 to 20 carbon atoms;
W is an arylene group or divalent heteroaromatic ring group; n is a number of 2 to 1,000; and
repetition of this structure forms a structure of a random copolymer, a graft copolymer, a block copolymer and/or a dendrimer.

2. A method for producing the electrochromic material according to claim 1, comprising:
halogenating a compound represented by formula (2) shown below to obtain a compound represented by formula (3) shown below, and cross-coupling the compound represented by the formula (3) with a compound represented by formula (4) shown below to prepare a monomer ingredient represented by formula (7) shown below; or
reacting the compound represented by the formula (2), in the presence of a base, with one kind selected from $MgCl_2$, $MgBr_2$, $MgI_2$, $ZnCl_2$, $ZnBr_2$, $ZnI_2$, $Sn(R^2)_3Cl$, $Sn(R^2)_3Br$, $Sn(R^2)_3I$ (each $R^2$ is independently an alkyl group or alkoxy group having 1 to 20 carbon atoms), a boron acid, and a boronate ester to obtain a compound represented by formula (5) shown below, and cross-coupling the compound represented by the formula (5) with a compound represented by formula (6) shown below to prepare the monomer ingredient represented by the formula (7); and
carrying out a polymerization of the monomer ingredient to produce a π-electron based conjugated polymer and then to produce an electrochromic material containing the polymer according to claim 1,

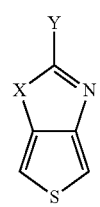
(2)

where in the formula (2),
X is any one selected from —S—, —O—, —Se— and —Te—, and
Y is any one selected from a hydrogen atom and an organic group having 1 to 20 carbon atoms,

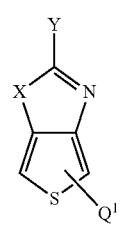
(3)

where in the formula (3),
X and Y are the same as described above, and
$Q^1$ is a halogen atom,

$Q^2$-W-$Q^2$ (4)

where in the formula (4),
W is an arylene group or a divalent heteroaromatic ring group, and $Q^2$ is one kind selected from a boron acid group, a boronate ester group, —MgCl, —MgBr, —MgI, —ZnCl, —ZnBr, —ZnI, and —Sn(R$^1$)$_3$, where each R$^1$ is independently a alkyl group or alkoxy group having 1 to 20 carbon atoms,

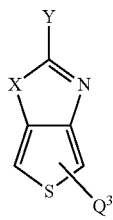

(5)

where in the formula (5),
X and Y are the same as described above, and
$Q^3$ is one kind selected from a boron acid group, a boronate ester group, —MgCl, —MgBr, —MgI, ZnCl, ZnBr, ZnI, Sn(R$^1$)$_3$, where each R$^1$ is independently an alkyl group and alkoxy group having 1 to 20 carbon atoms,

Q$^4$-W-Q$^4$ (6)

where in the formula (6),
W is the same as described before, and
each Q$^4$ is independently a halogen atom,

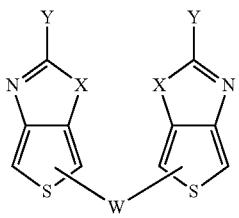

(7)

where in the formula (7),
each X is respectively any one selected from —S—, —O—, —Se— and —Te—,
each Y is respectively any one selected from a hydrogen atom and an organic group having 1 to 20 carbon atoms, and
W is an arylene group or a divalent hetero aromatic ring group.

3. The method for producing the electrochromic material according to claim 2, wherein:
the polymerization is carried out using a chemical polymerization of the monomer ingredient in the presence of or under a contact with a polyanion and an oxidant to produce the π-electron based conjugated polymer; or
the polymerization is carried out using an electrolytic polymerization by supplying an electric current to a mixture containing the monomer ingredient and an electrolyte to produce the electron based conjugated polymer.

* * * * *